E. M. O. DESCALLES.
PERMUTATION PADLOCK.
APPLICATION FILED MAR. 25, 1910.
1,006,366.
Patented Oct. 17, 1911.
4 SHEETS—SHEET 2.
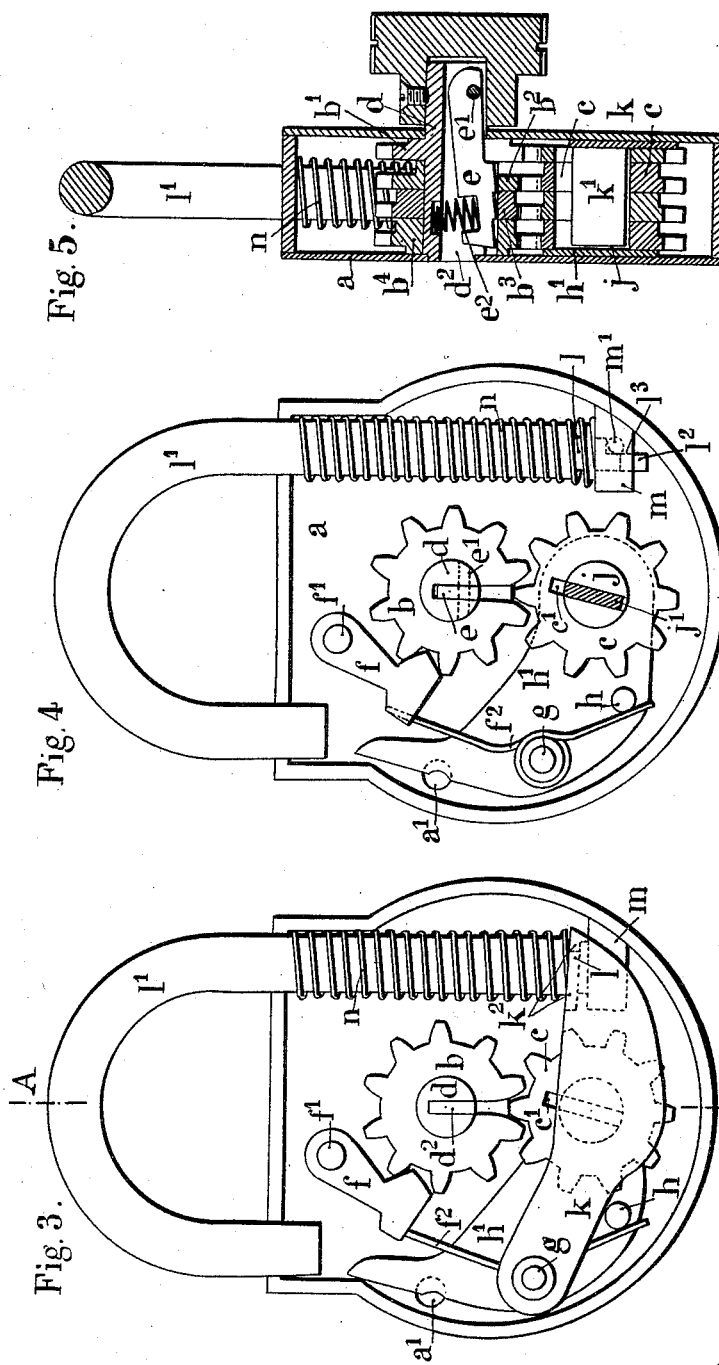
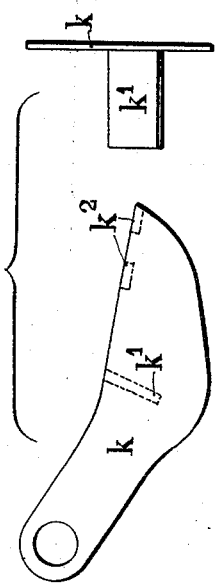
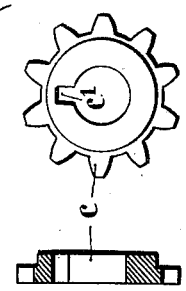
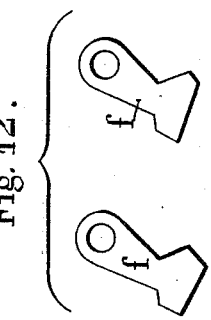
WITNESSES
W. P. Burk
John A. Percival
INVENTOR
Eugene Maurice Octave Descalles
BY Wm Wallace White
ATTY.

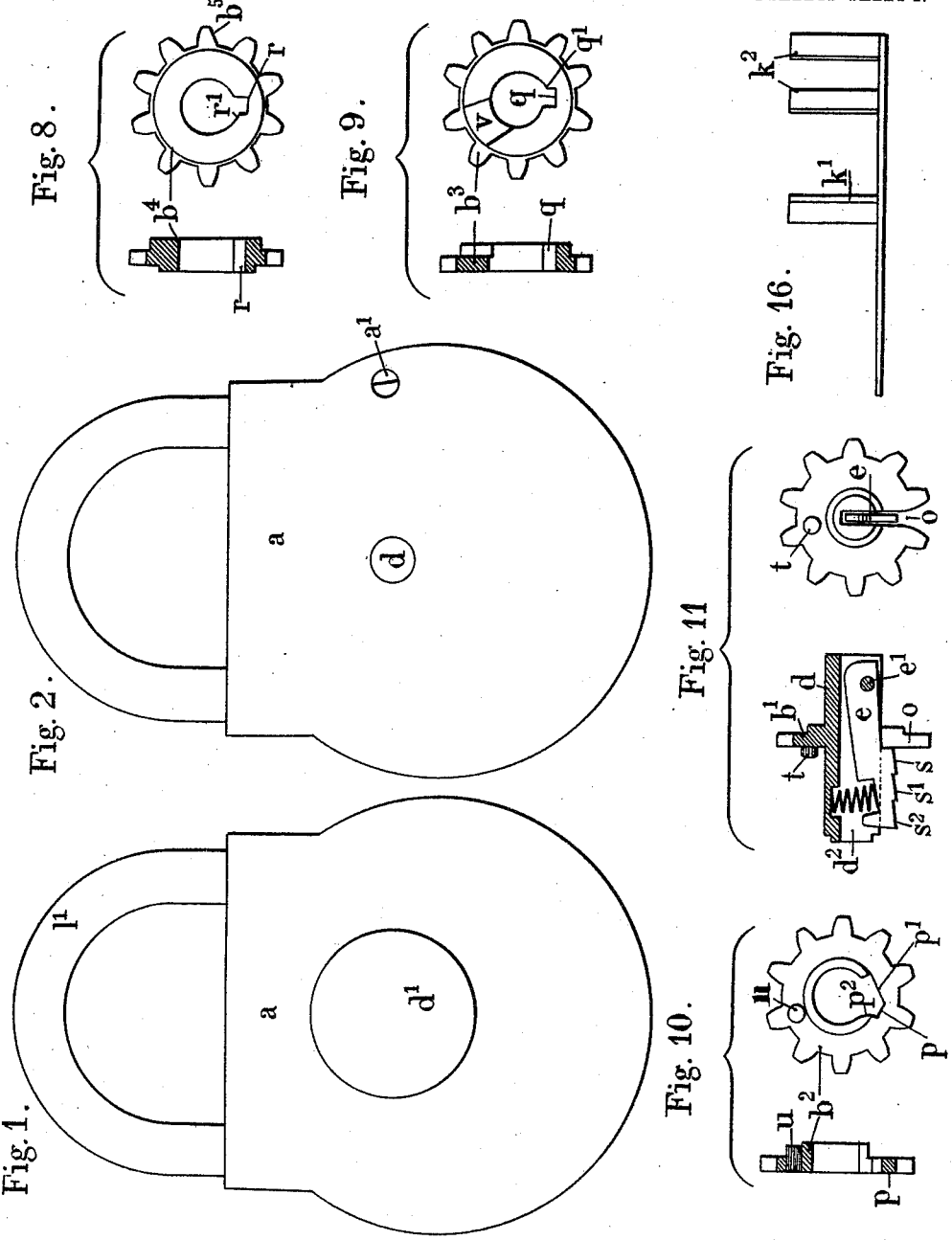

E. M. O. DESCALLES.
PERMUTATION PADLOCK.
APPLICATION FILED MAR. 25, 1910.

1,006,366.

Patented Oct. 17, 1911.

4 SHEETS—SHEET 3.

WITNESSES

W. P. Burks
John G. Percival

INVENTOR

Eugene Maurice Octave Descalles
By Wm. Wallace White
Atty

E. M. O. DESCALLES.
PERMUTATION PADLOCK.
APPLICATION FILED MAR. 25, 1910.
1,006,366.
Patented Oct. 17, 1911.
4 SHEETS—SHEET 4.
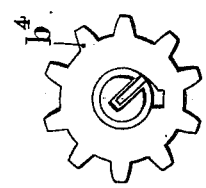
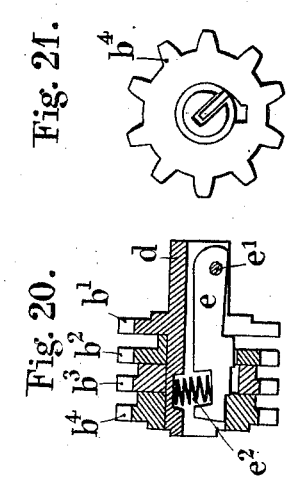
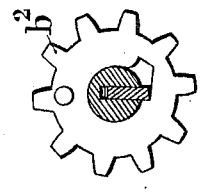
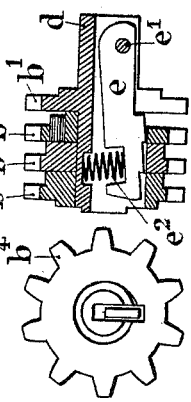
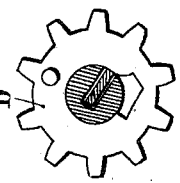
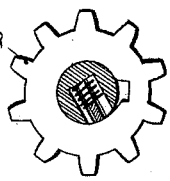
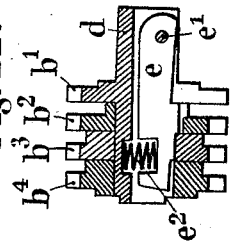

UNITED STATES PATENT OFFICE.

EUGÈNE MAURICE OCTAVE DESCALLES, OF PARIS, FRANCE, ASSIGNOR TO ALFRED BLOCH, OF PARIS, FRANCE.

PERMUTATION-PADLOCK.

1,006,366. Specification of Letters Patent. Patented Oct. 17, 1911.

Application filed March 25, 1910. Serial No. 551,425.

*To all whom it may concern:*

Be it known that I, EUGÈNE MAURICE OCTAVE DESCALLES, of 7$^{bis}$ Boulevard Rochechouart, in the city of Paris, Republic of France, mechanical engineer, have invented Improvements in Permutation-Padlocks, of which the following is a full, clear, and exact description.

The present invention has for its object an improved permutation-padlock, the parts of which are manipulated without a key, and in which all visual indication of figures is dispensed with. The mechanism of this padlock is operated by means of a manipulating knob, and this mechanism can only be brought into the position permitting the opening of the shackle of the padlock by a person knowing the figure or number of the permutation.

The improved padlock is characterized essentially by the combination of two mechanisms:—a first mechanism comprising a certain number of toothed wheels, which only permit the opening of the padlock when they are placed in the desired position to form the permutation selected; a second mechanism serving for the locking of the first mechanism and also formed by a certain number of wheels which should be placed in a predetermined position, forming another permutation, in order to permit, concurrently with the first mechanism, the opening of the padlock.

The invention comprises moreover a spring-lever arranged in the spindle of the permutation-wheels and permitting these wheels to be brought successively into the position in which the padlock can be opened, and also permitting the changing of the permutation.

Figure 6:
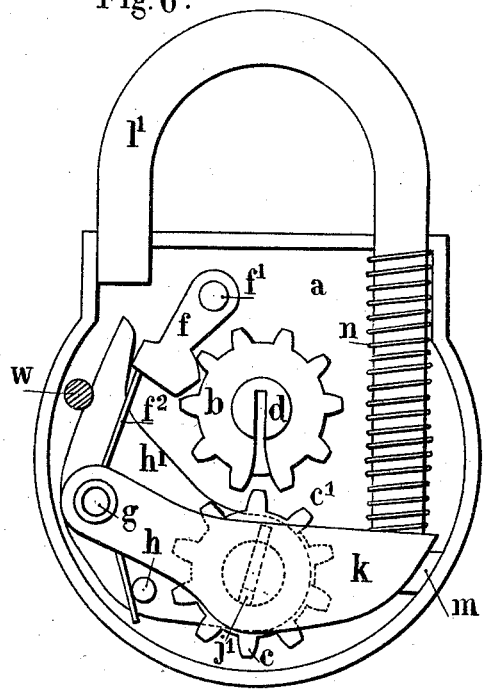
Figure 7:
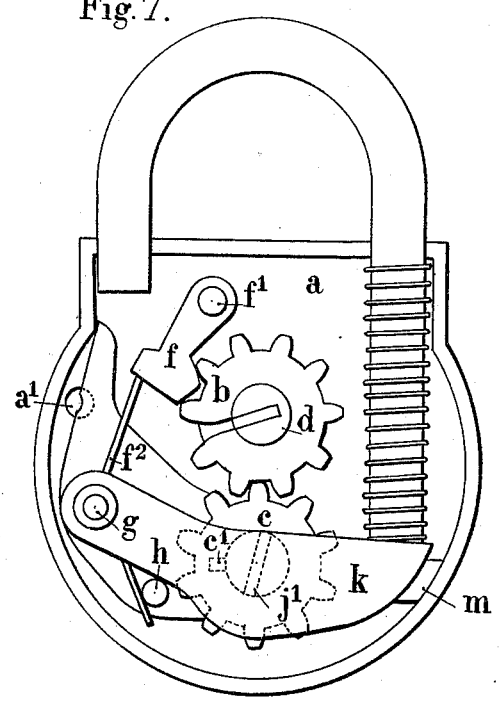
Figure 14:
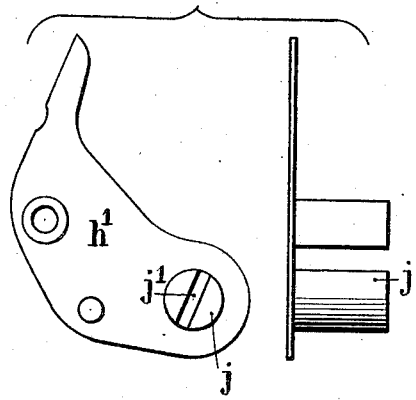
Figure 26:
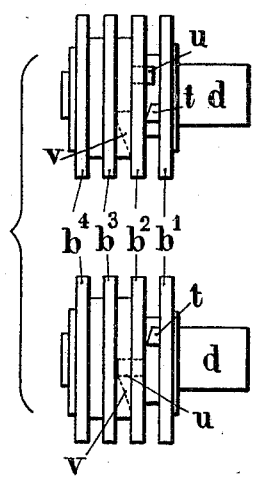

The invention is shown by way of example in the accompanying drawings in which:

Figure 1 is a front view of the padlock. Fig. 2 is a rear view thereof. Fig. 3 is a view corresponding to Fig. 1 the movable wall of the padlock-casing being removed. Fig. 4 shows the position occupied by the parts of padlock to permit the opening thereof. Fig. 5 is a vertical transverse section of the padlock on the line A—A, Fig. 3. Fig. 6 shows the position occupied by the parts of the padlock, when changing the permutation. Fig. 7 shows these same parts when the permutation has been broken. Figs. 8 to 11 show the permutation-wheels in elevation and in vertical section respectively. Fig. 12 shows the pawls acting on these wheels. Fig. 13 shows one of the locking wheels in elevation and in vertical section. Fig. 14 shows separately, in front and side elevation, a movable lock-plate, on which the locking wheels are mounted. Fig. 15 comprises a front view and a side view of the locking lever. Fig. 16 is a corresponding plan thereof. Figs. 17 to 25 are detail views showing the positions occupied successively by the operating lever in the formation of the permutation. Fig. 26 shows the arrangement for permitting the permutation-wheels to be brought back to zero.

As shown in the drawing, the improved padlock comprises a casing $a$, in the vertical axis of which are arranged two groups of toothed wheels $b$ and $c$. The wheels $b$ are mounted on a spindle $d$, one of the ends of which passes through the movable wall of the casing $a$ and receives a knob $d^1$. The wheels $b$ which, in the example shown, are four in number ($b^1$, $b^2$, $b^3$, $b^4$), serve to form the permutations by means of a special lever $e$, which is arranged to move in a longitudinal slot $d^2$ in the spindle $d$, as hereinafter described.

On each of the wheels $b$ acts a pawl or abutment $f$, which is pivoted on a pin $f^1$ and which is constantly in engagement with the corresponding toothed wheel, under the action of a spring $f^2$. The springs $f^2$ are coiled on a pin $g$, fixed in the casing $a$, and their lower ends bear against an abutment-pin $h$, fixed on a movable lock-plate $h^1$, which is capable of turning about the pin $g$. This lock-plate $h^1$ serves to support the second group of toothed wheels $c$, which are capable of gearing with the teeth $b$ and serve to form a locking mechanism. The wheels $c$ are movable about a pivot-pin $j$, fixed on the movable lock-plate $h^1$ and provided with a vertical slot $j^1$ dividing this pin into two equal parts. Each of these wheels $c$ is provided internally with a notch $c^1$ which can be made to form a prolongation of the slot $j^1$, in order to permit the opening of the padlock and the changing of the permutation, as will be hereinafter mentioned. On the pin $g$ is also pivoted the end of a metal piece $k$ forming a locking lever, on which are fixed a fence or tenon $k^1$ and two claws $k^2$.

The fence or tenon $k^1$ fits into the slot $j^1$, of the pivot pin $j$ and is of the same dimensions as this slot. The two claws $k^2$, which are arranged at the end of the lever $k$ are engaged in an annular groove $l$ formed in the lower part of the longer limb of the shackle $l^1$ of the padlock. The lower end $l^2$ of this longer limb is of a smaller diameter than that of the rest of the said limb and engages with a guide $m$ fixed on the side wall of the casing $a$. This end $l^2$ of the shackle has a recess $l^3$, into which extends a transverse pin or tenon $m^1$ arranged in the interior of the guide $m$, in order to prevent the shackle $l^1$ from turning more than a quarter of a revolution (Fig. 4), when the padlock is open. A spiral spring $n$, mounted on the longer limb of the shackle $l^1$ and bearing, at one end against the upper wall of the casing $a$, and at the other end on the claws $k^2$ of the lever $k$, tends to maintain the shackle $l^1$ continually in the closed position, that is to say, in the position in which the smaller limb of this shackle is engaged in the opening formed to receive it in the upper side of the casing $a$.

Before explaining the operation in detail, it is necessary to indicate how the permutations of the padlock are obtained. It has been seen that the wheels $b^1$, $b^2$, $b^3$ and $b^4$ are mounted on a spindle $d$, on which is fixed a knob $d^1$. This spindle $d$ has a longitudinal slot $d^2$, in which is mounted a lever $e$. The wheels $b^1$, $b^2$, $b^3$ and $b^4$ all have the same number of teeth, the latter being ten in number, representing the figures from 1 to 0 in their sequence. One can thus form any desired number of four figures. The toothed wheel $b^1$ is fixed on the spindle $d$ (Figs. 5 and 11) and is provided with a slot $o$ for permitting the lever $e$ to swing outwardly. The toothed wheels $b^2$, $b^3$ and $b^4$ are independent, that is to say, they are mounted on the spindle $d$ and can turn about the latter. The tooth wheel $b^2$ is provided in its interior with a recess having the form shown in Fig. 10, that is to say, it has a deep part $p$ the edge of which adjoins an incline $p^1$. The other side of the recess $p$ is formed with an incline $p^2$ uniting it with the inner surface of the central opening of the wheel. The wheel $b^3$ is also provided with a recess $q$, arranged in the axis of the said wheel and united on one side by an incline $q^1$ with the inner surface of the central opening of said wheel (Fig. 9). The wheel $b^4$ is also provided with a recess $r$, which is united on one side by means of an incline $r^1$ with the inner surface of the central opening of the wheel (Fig. 8). This incline $r^1$ is arranged in the opposite direction to the incline $q^1$ (Fig. 9). The pawls $f$, in engagement with the teeth of the wheels just described, are similar, except that in engagement with the wheel $b^4$, the nose of which is smaller and can engage between two particular teeth of the said wheel by reason of the special form of one of these teeth, namely $b^5$ (Fig. 8). This wheel $b^4$ can thus only be turned in one direction, while the wheels $b^1$, $b^2$ and $b^3$ can be turned in either direction as desired. The lever $e$ is mounted, at one end, on a pivot-pin $e^1$, extending transversely through the spindle $d$ of the wheels, and the other end constantly tends to be depressed under the action of a suitably-arranged spiral spring $e^2$ (Figs. 5 and 11). The lever $e$, which is formed of sheet metal, is notched on its outer edge to form steps $s$, $s^1$ and $s^2$, the height of which increases, starting from the free end of the lever, as shown in Fig. 11.

When the permutation-mechanism is at zero, the slot $o$ and the recesses $p$, $q$ and $r$ of the wheels $b^1$, $b^2$, $b^3$ and $b^4$ are all opposite to each other, in such a manner that the lever $e$, pressed outward by the spring $e^2$, occupies the whole depth of the said recesses (Fig. 5). This being mentioned, in order to set up any permutation, one proceeds in the following manner: The mechanism being at zero, the knob $d^1$ is turned from right to left and, consequently, also the spindle $d$ on which this knob is fixed. In this movement, the wheels $b^3$ and $b^4$, which are driven by the lever $e$ in engagement with the recesses of the said wheels, also turn, while the wheel $b^2$ remains immovable, being retained by its pawl $f$ during the time that the lever $e$ takes to pass along the incline $p^1$ following on the recess $p$ (Figs. 10 and 19). The wheel $b^2$ is then driven with the others by the lever $e$. The movement of the lever $e$ on the incline $p^1$ has for its result to raise the said lever slightly, as shown in Figs. 17 to 20, which consequently remains in engagement with the recesses of all the wheels $b^2$, $b^3$ and $b^4$. In turning the knob $d^1$, each tooth of these wheels, raising the pawls $f$, produces a click which is heard clearly and which permits the number of teeth which are passed to be counted. The movement is stopped when the first figure of the number chosen is reached. The knob $d^1$ is then turned in the opposite direction, that is to say, from left to right.

As the wheels $b^2$, $b^3$ and $b^4$ have always a tendency to be held fast by the pawls $f$, the step $s^2$ of the lever $e$ meeting the incline $r^1$ of the recess $r$ of the wheel $b^4$ engages with this incline. The lever $e$ is then raised slightly and the edge of the step $s^2$ comes to the level of the periphery of the internal aperture of the wheel $b^4$, as shown in Figs. 20 and 21. The wheel $b^4$, held by its pawl $f$, then remains immovable, while the wheels $b^3$ and $b^2$ are driven by the lever $e$. When the second figure of the number chosen is reached, the rotary motion of the spindle $d$ is arrested, and the knob $d^1$ then turned in the opposite direction, that is to say, from right to left. This movement has for its object to bring the step $s^1$ of the lever $e$ on to the incline $q^1$ of the recess $q$ of the wheel $b^3$ which is retained by its pawl $f$. The lever $e$ is then raised a certain distance, and the step $s^1$ placing itself at the level of the central aperture of the wheel $b^3$, the latter is rendered immovable (Figs. 22 and 23). When the third figure of the number chosen is reached, the actuating knob is turned in the opposite direction, that is to say, again from left to right.

The movement above described is repeated, the step $s$ of the lever $e$ comes on to the incline $p^2$ of the wheel $b^2$ which is retained by its pawl $f$; this has for its result to raise the said lever, which is then completely freed, as shown in Figs. 24 and 25. It then only remains to turn the knob $d^1$ in order to drive the toothed wheel $b^1$ up to the moment when the fourth figure of the number chosen has been reached. The return to zero of the wheels $b^1$, $b^2$, $b^3$ and $b^4$ is effected in the following manner:—The knob $d^1$ is turned from left to right, but as, by reason of the raising of the lever $e$, the latter has no longer any action on the wheels $b^2$, $b^3$ and $b^4$, the wheel $b^1$, which is fixed to the spindle $d$, bears an inclined projection $t$ that is adapted to come into contact with a projection $u$ mounted to slide axially in an aperture in the wheel $b^2$ (Figs. 10, 11 and 26). When the knob $d^1$ is turned from left to right, the projection $t$, at a certain moment, abuts against the movable projection $u$ and, since the wheel $b^2$ in which this projection is mounted, is retained by its pawl $f$, the projection $u$ is pushed back and engages in a lateral inclined recess $v$ on the wheel $b^3$. When this projection has come into contact with the bottom of the recess $v$, it drives the wheel $b^3$ (Fig. 26). The lever $e$, pushed outward by its spring $e^2$, then falls successively into the recesses $p$, $q$ and $r$ of the wheels $b^2$, $b^3$ and $b^4$, which are thus locked together. On continuing to turn the knob in the same direction, the pawl $f$, acting on the wheel $b^4$, is raised successively by the passage of each tooth, until the moment when the tooth $b^5$ presents itself. By reason of the form of this tooth, the nose of the pawl $f$ passes in farther and renders immovable the wheel $b^4$ and consequently also the whole mechanism when turned in this direction. It is now possible to explain the general operation of the padlock. The different parts of the latter being in the position shown in Fig. 3, that is to say, in the position where the notches $c^1$ of the wheels $c$ are placed one above the other and in the prolongation of the slot $j^1$ in the pivot-pin $j$, there is introduced into an aperture $a^1$ formed in the back of the casing $a$, a conical pin $w$ which, gradually pushing before it the edge of the lock-plate $h^1$, causes the latter to turn about the pivot-pin $g$, as shown in Fig. 6 of the drawing. This movement of the lock-plate is permitted by reason of the engagement of the fence or tenon $k^1$ of the lever $k$ in the notches $c^1$ (Fig. 6), this latter lever remaining immovable. The teeth of the wheels $c$ are then disengaged from the teeth of the wheels $b$, in such a manner that any desired number of four figures can be set up by moving the said wheels $b$ in the manner described above.

When the desired number is found, the pin $u$ is removed, which has for its result to bring the wheels $c$ toward the wheels $b$ the movable lock-plate $h^1$ moving upward under the action of the springs $f^2$ of the pawls $f$. The parts of the mechanism are then in the position shown in Figs. 3 and 4, which is the only position admitting the opening of the padlock. In fact, if a pull be applied at this moment to the shackle $l^1$ of the padlock, the locking lever $k$, by reason of the engagement of its claws $k^2$ in the groove $l$ of the shackle, will be raised simultaneously with the latter. The notches $c^1$ of the wheels $c$ are in the prolongation of the slot $j^1$ of the pivot-pin $j$ and the fence or tenon $k^1$ on the lever $k$ passes into these notches, which permits the end of the said lever to be raised; this lever is then carried along with the shackle, at the same time compressing the spring $n$. This displacement of the lever $k$ permits the passage of the shorter limb of the shackle $l^1$ out of its recess and consequently the opening of the padlock. To close the padlock, it is only necessary to bring this shorter limb back into position above the opening designed to receive it. The spring $n$, then acting on the lever $k$, pushes back the latter which, carrying with it the longer limb of the padlock by means of its claws $k^2$, replaces the different parts in the position shown in Fig. 3. When these parts are in this position, if the knob $d^1$ be turned in one or the other direction, the permutation is broken, as shown in Fig. 7. The movement of the wheels $b$ has for its result to turn the wheels $c$, with which they gear, so that these wheels $c$ are moved in such a manner that their notches $c^1$ no longer coincide with the slot $j^1$ in the pivot-pin $j$. It is then impossible to open the padlock, the lever $k$ being held fast, since it can only be moved if the notches $c^1$ are placed in the prolongation of the slot $j^1$. Any attempt to introduce a pin into the aperture $a^1$ in the casing $a$ would then have no result. The permutation being broken, in order to be able to open the padlock again, all the wheels $b$ are brought back to zero by turning the knob $d^1$ from left to right, the number is then re-formed so as to permit opening in the manner above described. When this number is formed, the notches $c$ of the wheels $c$ are in the prolongation of the slot $j^1$ in the pivot-pin $j$, in such a manner that the shackle $l^1$ can be raised, as above described. It will thus be seen, from what precedes, that it is necessary to bring back the permutation-mechanism and the locking mechanism into a predetermined position, in order to permit the opening of the padlock. Moreover, the parts of the mechanism are all very strong and only take up a small amount of space, so that the size of the padlock does not need to be increased beyond the normal.

In the accompanying drawing, there is shown a permutation-mechanism comprising four toothed wheels, but it is obvious that the number of these wheels may be increased or diminished according to requirements by modifying some of the details of construction. For example, in the case where the permutation-mechanism only comprises three wheels, the arrangement for returning the parts to zero would be dispensed with, the incline in the wheel $b^2$ being arranged in the opposite direction, which permits the driving of the wheels when the knob is turned from left to right.

It is obvious that the mechanism permitting the permutations to be obtained, as well as the locking device of the padlock, can be applied to all kinds of fastening devices, such as locks, bolts and the like.

The above arrangements are only given by way of example, the forms, dimensions and detail arrangements can be varied according to each particular case, without departing from the nature of the invention.

Claims:

1. In a keyless permutation padlock, permutation mechanism comprising a plurality of rotatable members provided with recesses and a lever provided with steps adapted to co-act with said recesses, locking mechanism operatively associated with said rotatable members, and a locking lever controlled by said locking mechanism.

2. In a keyless permutation padlock, permutation mechanism comprising four toothed wheels provided with recesses and a lever provided with steps adapted to co-act with said recesses, locking mechanism operatively associated with said wheels, and a locking lever controlled by said locking mechanism.

3. In a keyless permutation padlock, permutation mechanism comprising four toothed wheels provided with recesses and a lever provided with steps adapted to co-act with said recesses, a spindle for said wheels and connected with one of said wheels, a knob secured to the spindle, locking mechanism operatively associated with said wheels, and a locking lever controlled by said locking mechanism.

4. In a keyless permutation padlock, permutation mechanism comprising four toothed wheels, a spindle, one of said wheels being secured to said spindle, the others of said wheels being rotatably supported thereon, said rotatable wheels being provided with recesses communicating with the central openings in said wheels, said recesses being provided with inclined sides, a lever provided with steps co-acting with the said recesses, locking mechanism operatively associated with said wheels, and a locking lever controlled by said locking mechanism.

5. In a keyless permutation padlock, permutation mechanism comprising four toothed wheels, a spindle, one of said wheels being secured to said spindle, the others of said wheels being rotatably supported thereon, said rotatable wheels being provided with recesses communicating with the central openings in said wheels, said recesses being provided with inclined sides, said spindle being provided with a slot, a lever pivotally mounted within said slot and provided with steps co-acting with the said recesses, a knob secured to said spindle, locking mechanism operatively associated with said wheels, and a locking lever controlled by said locking mechanism.

6. In a keyless permutation padlock, permutation mechanism comprising four toothed wheels, a spindle, one of said wheels being secured to said spindle, the others of said wheels being rotatably supported thereon, said rotatable wheels being provided with recesses communicating with the central openings in said wheels, said recesses being provided with inclined sides, said spindle being provided with a slot, a lever pivotally mounted within said slot and provided with steps co-acting with said recesses, a knob secured to said spindle, locking mechanism operatively associated with said wheels, a locking lever controlled by said locking mechanism, pawls engaging the teeth of said wheels, and springs holding said pawls in position.

7. In a keyless permutation padlock, permutation mechanism comprising a plurality of rotatable toothed wheels provided with recesses, and a lever provided with steps adapted to co-act with said recesses, locking mechanism operatively associated with said rotatable wheels, said mechanism comprising a plurality of toothed wheels adapted to gear with said first mentioned toothed wheels, and a locking lever controlled by said locking mechanism.

8. In a keyless permutation padlock, permutation mechanism comprising a plurality of rotatable toothed wheels provided with recesses and a lever provided with steps adapted to co-act with said recesses, locking mechanism operatively associated with said rotatable wheels, said mechanism comprising a plurality of toothed wheels adapted to gear with said first mentioned toothed wheels, each of said toothed wheels forming the locking mechanism being provided with a central opening and with a recess communicating therewith, and a locking lever controlled by said locking mechanism, said locking lever being provided with a portion adapted to coöperate with said recesses.

9. In a keyless permutation padlock, permutation mechanism comprising a plurality of rotatable toothed wheels provided with recesses and a lever provided with steps adapted to co-act with said recesses, locking mechanism operatively associated with said rotatable wheels, said mechanism comprising a plurality of toothed wheels adapted to gear with said first mentioned toothed wheels, each of said toothed wheels forming the locking mechanism being provided with a central opening and with a recess communicating therewith, a movable locking plate carrying an axis upon which the toothed wheels of said locking mechanism are mounted, and a locking lever controlled by said locking mechanism, said locking lever being provided with a portion adapted to coöperate with said recesses.

10. In a keyless permutation padlock, permutation mechanism comprising a plurality of rotatable toothed wheels provided with recesses and a lever provided with steps adapted to co-act with said recesses, locking mechanism operatively associated with said rotatable wheels, said mechanism comprising a plurality of toothed wheels adapted to gear with said first mentioned toothed wheels, each of said toothed wheels forming the locking mechanism being provided with a central opening and with a recess communicating therewith, a movable locking plate carrying a pivot pin upon which the toothed wheels of said locking mechanism are mounted, said pin being provided with a slot, a spring holding said locking plate in its normal position, and a locking lever controlled by said locking mechanism, said locking lever being provided with a portion adapted to coöperate with said slot and said recesses.

11. In a keyless permutation padlock, a shackle, permutation mechanism comprising a plurality of toothed wheels provided with recesses and a lever provided with steps adapted to co-act with said recesses, locking mechanism operatively associated with said rotatable wheels, said mechanism comprising a plurality of toothed wheels adapted to gear with said first mentioned toothed wheels, each of the toothed wheels forming the locking mechanism being provided with a central opening and with a recess communicating therewith, a movable locking plate carrying a pivot pin upon which the toothed wheels of said locking mechanism are mounted, said pin being provided with a slot, a spring holding said locking plate in its normal position, and a locking lever controlled by said locking mechanism, said lever being provided with a portion adapted to coöperate with said slot and said recesses, said lever being further provided with claws engaging said shackle.

12. In a keyless permutation padlock, a shackle, permutation mechanism comprising a plurality of toothed wheels provided with recesses and a lever provided with steps adapted to co-act with said recesses, locking mechanism operatively associated with said rotatable wheels, said mechanism comprising a plurality of toothed wheels adapted to gear with said first mentioned toothed wheels, each of the toothed wheels forming the locking mechanism being provided with a central opening and with a recess communicating therewith, a movable locking plate carrying a pivot pin upon which the toothed wheels of said locking mechanism are mounted, said pin being provided with a slot, a spring holding said locking plate in its normal position, and a locking lever controlled by said locking mechanism, said lever being provided with a portion adapted to coöperate with said slot and said recesses, said lever being further provided with claws engaging said shackle, said padlock being provided with an opening in its casing adapted to permit a pin to be inserted to move said locking plate from its normal position.

The foregoing specification of my improvements in permutation-padlocks, signed by me this fifteenth day of March 1910.

EUGÈNE MAURICE OCTAVE DESCALLES.

Witnesses:
 DEAN B. MASON,
 R. EHIRIOT.

---

Copies of this patent may be obtained for five cents each, by addressing the "Commissioner of Patents, Washington, D. C."